Patented June 20, 1950

2,511,987

UNITED STATES PATENT OFFICE

2,511,987

METHOD FOR TREATMENT OF AND PACKAGE FOR DRIED FRUIT

Emil M. Mrak, Herman J. Phaff, and Rita E. Whelton, Berkeley, and Charles D. Fisher, Fresno, Calif.

No Drawing. Application December 13, 1945, Serial No. 634,902

8 Claims. (Cl. 99—171)

This invention relates generally to methods for the treatment of and packages for fruit products to preserve same. More particularly the invention relates to methods for treatment of and packages for dried fruits to prevent the occurrence of crystallization of sugar and microbiological food spoilage.

It is an object of this invention to provide a method for preserving dried fruit products in containers by preventing sugaring and inhibiting microbiological spoilage resulting from the growth of yeasts, molds and bacteria on the product.

It is a further object of this invention to provide a method for treating fruit packaged in small cartons, a number of which are contained in a sealed outer container by adding a fumigant to the outer container before sealing.

Another object of this invention is to provide a method for treating dried fruits by increasing the moisture content of the dried fruit to a point to prevent ultimate sugaring, and subjecting the fruit to a highly volatile fumigant, used alone or in combination, while maintaining the moisture content of the dried fruit high enough to prevent sugaring.

A further object of the invention is to provide a method for treating and packaging dried fruit products including the steps of packaging the fruit in small cartons, placing a number of small cartons in a large master container, adding a fumigant within the master container, and sealing the master container.

Another object of the invention is to provide a new article of manufacture in the form of a package comprising small pervious cartons containing a fruit product, the cartons being contained in a sealed master container, and the master container containing a highly volatile fumigant which penetrates through the individual small cartons into contact with their contents at substantially atmospheric pressure after sealing of the master storage container.

Still another object of this invention is to provide a new article of manufacture in the form of a container containing dried fruit and a fumigant, the dried fruit having a moisture content sufficiently high to prevent crystallization of sugar on the surface of the fruit and the container being impervious to moisture.

Other objects and advantages of the present invention will appear in the following detailed description and be particularly pointed out in the appended claims.

Microbiological spoilage of dried fruits may result from the growth of yeasts, molds and certain types of bacteria on the product. Fermentation caused by yeast, or molding, occurs most frequently on unsulfured fruits, such as prunes, figs, dates and natural raisins, during sun drying and in the dried product when the moisture level is sufficiently high. It is possible to bring the moisture content of any fruit to a level low enough so that fermentation and molding cannot occur, but before final packaging, most fruit is processed to raise the moisture content to render the fruit more edible and give it a more attractive appearance and texture. In the case of prunes and figs, processing in boiling water before packaging kills yeasts and molds which are present on the fruit, but recontamination may occur during plant handling if the fruit is allowed to cool before packing. Under these conditions if the moisture content is sufficiently high, molding or fermentation is sure to occur. Figs are particularly susceptible to molding. Dates are sometimes subjected to a heat treatment sufficient to kill microorganisms but this is usually accompanied by unnatural ordors and flavors. It is therefore advantageous to accomplish killing of microorganisms in dried fruits without heat treatment.

This invention is characterized by the use of fumigants to kill not only insects but also to kill microorganisms such as bacteria, yeasts and molds without heat treatment. A suitable fumigant is ethylene oxide, used either alone or mixed with some substance which lowers its vapor pressure. In preliminary tests, fumigants tested were isopropyl formate, ethyl formate, and "Oxyfume," the latter consisting of a solution of approximately 20 per cent ethylene oxide in ethylene dichloride, the ethylene dichloride being used to reduce the vapor pressure of the ethylene oxide. "Oxyfume" has been used in industry on the packaging line by adding it to foods in containers with pervious walls, through which the uncombined portion may later escape. Since ethylene dichloride leaves on foods a residue disagreeable in odor and taste, it was found more satisfactory to use the ethylene oxide alone or in other solvents. All of these fumigants were found to be more or less effective in inhibiting molds and yeasts.

It was also found that propylene oxide can be used very effectively as a killing agent for yeasts and molds. Propylene oxide is a liquid at ordinary temperatures, and more convenient to handle than ethylene oxide which is a gas at ordinary temperatures. However, ethylene oxide requires a less concentration to kill yeasts and molds than the propylene oxide. Another insect fumigant tested was methyl bromide but this compound required a high concentration for complete killing of microorganisms.

Tests were conducted to show the effect of "Oxyfume." Prunes heavily inoculated with yeast in glass jars were treated with "Oxyfume" and complete killing took place after 24 hours exposure to 1 cc. of "Oxyfume" per liter total volume at room temperature. This was later repeated with actively fermenting dates, and it was found possible to kill all of the yeasts overnight by the same procedure.

Although dried fruit may be packed in glass jars on or in tin cans, it is often packed in non-rigid wall containers. Much dried fruit is now packed in small cardboard cartons, these being placed in fibre-board storage containers which are dipped in a thermoplastic wax for sealing in moisture and the fumigant. This combination of materials is one of the best substitutes for tin or glass as far as insect infestation is concerned. Tests with fumigants to destroy microorganisms in packaged fruit were made with such containers. It was found possible to kill all organisms on the fruit by adding fumigant to the center of the large container immediately before sealing and dipping. If the box were left standing for any period of time before dipping in the wax, some organisms survived the treatment.

It was found that the fumigant could be applied on a regular packaging line to master cartons containing 12 individual 2 pound fumigant-pervious cartons of prunes with 25–26 per cent moisture. Immediately before gluing the flaps of the master carton and dipping in thermoplastic wax, various amounts of "Oxyfume" (5–25 cc.) or ethylene oxide (4–7 cc.) were added to the center of the master container. Controls of fruit artificially contaminated with yeast and mold were included, and the extent of molds on such inoculated fruit was far greater than would be found under normal plant conditions. It was found that complete killing of yeast was obtained with all the concentrations tested. Upon prolonged storage, mold spoilage was never observed in any case.

It was also found that the fumigant could be applied to a master container containing 23 individual 12-ounce inside lined chipboard fumigant-pervious packages, outside wrapped with moisture proof cellophane, containing figs with 24.5 per cent moisture content. A corrugated cardboard was placed in the large master container and the fumigant was poured on this cardboard before sealing and dipping of the master container. Various amounts of "Oxyfume" (5–25 cc.) and ethylene oxide (4–7 cc.) were used. After sealing the master storage container, the volatile fumigant penetrated the walls of the pervious individual packages during ordinary storage conditions, i. e., at atmospheric pressure, and contacted the contents of the packages. The result of this packaging test was successful and similar to those obtained with prunes. However, using the cellophane wrapped individual cartons, it was found that 5 cc. of "Oxyfume" in the master container was a lower limit for effective killing of microorganisms, since one container receiving this amount showed a little mold spoilage after long storage. None of the containers receiving pure ethylene oxide or larger amounts of "Oxyfume" showed mold growth.

Further packaging tests were made on figs of normal moisture content (22 per cent) and high moisture content (over 30 per cent). As has been mentioned above, ethylene dichloride is undesirable as a solvent for ethylene oxide when the mixture is to be used on foods, since it leaves a residue disagreeable in odor, especially when the master container is dipped in a coating relatively impervious to its vapors. To kill insects at the same time as microorganisms, and to avoid a residue disagreeable in odor, it was found advantageous to use isopropyl formate as a substitute solvent for ethylene oxide. Mixtures of this with 10, 15 and 20 per cent ethylene oxide were made. The figs were packed in 12-ounce cartons as described above. The fumigant was added by hand to the packages immediately before sealing by means of specially designed pipettes on the packaging line. Several amounts of fumigant were used, and controls receiving isopropyl formate alone, as well as some receiving no fumigant at all, were included. Part of this fruit was artificially inoculated with yeast and mold. Mold was evident in the unfumigated, high moisture controls after five weeks storage. The high moisture fruit receiving isopropyl formate alone kept somewhat longer, barely starting to mold after five weeks storage. But after eight weeks, two packages out of five were completely molded, confirming the slight germicial activity of isopropyl formate, used alone. None of the high moisture fruit receiving ethylene oxide showed mold growth during storage of six to seven months duration. It was found that as little as 0.5 cc. of 10 per cent ethylene oxide in isopropyl formate per 12-ounce package was an adequate amount. For higher concentrations of ethylene oxide, proportionately less quantities are required. Percentage mixtures of ethylene oxide higher than 10, 15 and 20 per cent can also be used.

The low moisture figs, of course, supported mold growth less readily, although controls (especially those artificially inoculated) eventually showed some molding. With figs, however, the occurrence of "sugaring" was very widespread. "Sugaring" is a term used to describe the crystallization of sugar on the surface of the fruit. Frequently, but not invariably, considerable numbers of yeast cells are found in the sugary material. This sugaring process constitutes a major problem in the prune and especially in the fig industry. Fruit which has sugared is objectionable in appearance, and cannot be sold without additional processing. This not only involves further expense, particularly when sugaring occurs after packaging, but is also responsible for a loss of nutrients from the fruit.

It was found that sugaring began in the low moisture figs after about five weeks and increased gradually during subsequent storage. The fumigant did nothing to inhibit this sugaring process in the low moisture fruit. Sugaring was enhanced by cooling the figs gradually to a temperature of 32° F. It seems evident that in figs the sugaring process is purely a physical phenomenon, bearing no relation to microbial growth. However, none of the high moisture content fruit showed sugaring unless it was allowed to dry to approximately 25 to 27 per cent moisture content or less. At this moisture level, which appears to represent a borderline concentration for sugaring, traces of crystallization were observed. Thus, the use of fumigants to control the growth of microorganisms makes it possible to prevent sugaring in figs, since the fruit may be packed at a moisture content high enough so that no crystallization takes place. To prevent sugaring the moisture content of the dried fruit must be maintained at above 25 per cent in the container, and this is accomplished by sealing the container by moisture proof cellophane or by dipping in thermoplastic wax.

This invention can be applied to containers containing dried fruit without the use of inner individual cartons. The dried fruit is placed directly in the container and the moisture content is increased to above 25 per cent, the fumigant is added and the container is sealed. Where the containers are metallic cans, no further sealing is required. Where the containers are made of carboard or other pervious material, they must be sealed against loss of moisture by the use of moisture proof cellophane or by dipping in a thermoplastic wax or by other suitable means.

The thermoplastic wax will seal in both the moisture and the fumigant. The moisture proof cellophane will seal in the moisture but some of the fumigant may be lost through the cellophane, but the results are still successful despite some loss of the fumigant.

In practicing this invention, when propylene oxide is used as the fumigant instead of ethylene oxide, a somewhat greater concentration of the propylene oxide is used, ranging from the same amount as that of the ethylene oxide to an amount 30 per cent greater than the amount of ethylene oxide.

It was also found that dry yard spoilage of fruit could be reduced materially by treating the fruit with the above fumigants, such as ethylene oxide, after harvesting and before sun drying.

While the invention has been described in more or less detail, it is not to be limited thereby, as equivalents may be substituted, without departing from the spirit and scope of the invention as defined in the following claims.

What we claim is:

1. In a method of packaging and preserving dried fruit products containing natural sugar against spoilage by growth of microorganisms, the steps of adjusting the water content of said fruit to a water concentration of at least about 25% to dissolve the sugar in said fruit, packaging the fruit in small fumigant-pervious containers, packaging a number of said small containers in a large fumigant-impervious storage container, adding a highly volatile fumigant within the space between said small containers and said storage container, said fumigant being capable of penetrating through said small containers into contact with said fruit at substantially atmospheric pressure, and sealing the storage container.

2. In a method of packaging and preserving dried fruit products containing natural sugar against spoilage by growth of microorganisms, the steps of adjusting the water content of said fruit to a water concentration of at least about 25% to dissolve the sugar in said fruit, packaging the fruit in small fumigant-pervious containers, packaging a number of said small containers in a large fumigant-impervious storage container, adding a liquid solution of ethylene oxide within the space between said small containers and said storage container, said ethylene oxide being capable of penetrating through said small containers into contact with said fruit at substantially atmospheric pressure, and sealing the storage container.

3. In a method of packaging and preserving dried fruit products containing natural sugar against spoilage by growth of microorganisms, the steps of adjusting the water content of said fruit to a water concentration of at least about 25% to dissolve the sugar in said fruit, packaging the fruit in small fumigant-pervious containers, packaging a number of said small containers in a large fumigant-impervious storage container, adding a liquid solution of ethylene oxide in isopropyl formate within the space between said small containers and said storage container, said ethylene oxide being capable of penetrating through said small containers into contact with said fruit at substantially atmospheric pressure, and sealing the storage container.

4. In a method of packaging and preserving dried fruit products containing natural sugar against spoilage by growth of microorganisms, the steps of adjusting the water content of said fruit to a water concentration of at least about 25% to dissolve the sugar in said fruit, packaging the fruit in small fumigant-pervious containers, packaging a number of said small containers in a large fumigant-impervious storage container, adding propylene oxide within the space between said small containers and said storage container, said propylene oxide being capable of penetrating through said small containers into contact with said fruit at substantially atmospheric pressure, and sealing the storage container.

5. A composite package comprising a fumigant-impervious sealed storage container, at least one fumigant-pervious container containing dried fruit whose water content is adjusted to at least about 25% and being contained in said sealed storage container at substantially atmospheric pressure, and a highly volatile fumigant contained at said pressure in the space between said storage container and said fumigant-pervious container and capable of penetrating through said fumigant-pervious container into contact with said fruit.

6. A composite package comprising a fumigant-impervious sealed storage container, at least one fumigant-pervious container containing dried fruit whose water content is adjusted to at least about 25% and being contained in said sealed storage container at substantially atmospheric pressure, and a liquid solution of ethylene oxide contained at said pressure in the space between said storage container and said fumigant-pervious container, said ethylene oxide being capable of penetrating through said fumigant-pervious container into contact with said fruit.

7. A composite package comprising a fumigant-impervious sealed storage container, at least one fumigant-pervious container containing dried fruit whose water content is adjusted to at least about 25% and being contained in said sealed storage container at substantially atmospheric pressure, and a liquid solution of ethylene oxide in isopropyl formate contained at said pressure in the space between said storage container and said fumigant-pervious container, said ethylene oxide being capable of penetrating through said fumigant-pervious container into contact with said fruit.

8. A composite package comprising a fumigant-impervious sealed storage container, at least one fumigant-pervious container containing dried fruit whose water content is adjusted to at least about 25% and being contained in said sealed storage container at substantially atmospheric pressure, and propylene oxide contained at said pressure in the space between said storage container and said fumigant-pervious container, said propylene oxide being capable of penetrating through said fumigant-pervious container into contact with said fruit.

EMIL M. MRAK.
    HERMAN J. PHAFF.
    RITA E. WHELTON.
    CHARLES D. FISHER.

REFERENCES CITED

The following references are of record in the file of this patent:

UNITED STATES PATENTS

| Number | Name | Date |
|---|---|---|
| 1,863,355 | Schibsted | June 14, 1932 |
| 2,075,845 | Gross et al. | Apr. 6, 1937 |
| 2,080,179 | Merriam et al. | May 11, 1937 |
| 2,107,697 | Griffith et al. | Feb. 8, 1938 |
| 2,298,545 | Waters | Oct. 13, 1942 |
| 2,370,768 | Baerwald | Mar. 6, 1945 |
| 2,401,131 | Bensel | May 28, 1946 |

OTHER REFERENCES

U. S. Dept. of Agriculture, Dept. Bulletin No. 1313, article entitled "Fumigation Against Grain Weevils With Various Volatile Organic Compounds," by I. E. Neifert et al., January 26, 1925, published by the Government Printing Office, Washington, D. C., page 16, "Esters."

"Principles of Fruit Preservation," 1933, by T. N. Morris, published by Chapman and Hall, Ltd., London, pages 160–162.